United States Patent [19]

Lefeuvre

[11] 4,016,076
[45] Apr. 5, 1977

[54] PROCESSING OF EMULSIONS

[75] Inventor: Antoine Augustin Joseph Lefeuvre, Ennery, France

[73] Assignee: Societe d'Etudes et de Realisations Industrielles, Le Chesnay, France

[22] Filed: Mar. 21, 1974

[21] Appl. No.: 453,544

[30] Foreign Application Priority Data
Mar. 21, 1973  France .............................. 73.10045
Jan. 23, 1974  France .............................. 74.02173

[52] U.S. Cl. .................................. 210/61; 210/62; 252/330
[51] Int. Cl.² .......................................... C02B 1/18
[58] Field of Search ................ 210/21, 22, 61, 62; 252/330, 358

[56] References Cited
UNITED STATES PATENTS

| 1,847,413 | 3/1932 | Pollock ............................. 210/21 X |
| 1,984,432 | 12/1934 | Robinson ........................ 252/330 X |
| 2,588,794 | 3/1952 | Barton .................................. 210/21 |
| 2,807,654 | 9/1957 | Grimmett et al. ............... 210/21 X |
| 3,262,566 | 7/1966 | Peters .............................. 252/330 X |
| 3,300,405 | 1/1967 | Black .................................. 210/21 |
| 3,363,399 | 1/1968 | Schmauch et al. ............ 252/330 X |
| 3,446,732 | 5/1969 | Gasser et al. .......................... 210/44 |
| 3,689,406 | 9/1972 | Ohta et al. ........................... 210/23 |
| 3,741,908 | 6/1973 | Dailey ................................. 252/330 |

Primary Examiner—Frank A. Spear, Jr.
Attorney, Agent, or Firm—Armstrong, Nikaido & Wegner

[57] ABSTRACT

In order to effect the separation of two liquids, particularly two liquids in the form of an emulsion, one of the liquids, the dispersed component of the emulsion, is concentrated in the form of an emulsion which is inverted with respect to the initial emulsion, i.e. is an emulsion of the previously dispersing component in the previously dispersed component. Thereafter the inverted emulsion can be separated off from the remainder of the initial mixture. Chemical agents and agitation may be employed to promote the formation of the inverted emulsion. The process is especially applicable to oil-in-water emulsions known as soluble oils.

2 Claims, 1 Drawing Figure

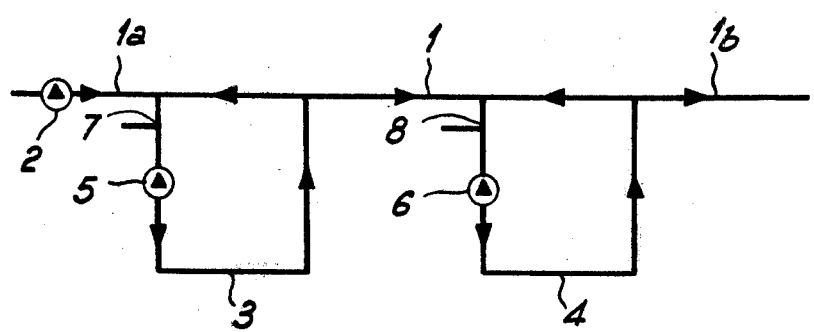

PROCESSING OF EMULSIONS

BACKGROUND OF THE INVENTION

1. FIELD OF THE INVENTION

This invention relates to improvements in or relating to the processing of emulsions and provides novel processes in this field and novel apparatus for performing such processes.

2. DESCRIPTION OF THE PRIOR ART

The difficulty of separating mixtures of non-miscible liquids increases when the constituents of the mixtures have a reduced tendency to separate naturally and when there is a considerable difference between the proportions of the liquids in the mixture. Many mixtures used in industry, however, exhibit these conditions; a liquid is often dispersed in the form of an emulsion having a certain stability in another liquid at a concentration which, though low, is too great for the emulsion to be simply thrown away, either because of the resulting enviromental pollution of for reasons of expense in an industrial process where the constituent in low concentration is expensive. Processing is therefore required to remove the liquid at low concentration from the liquid at high concentration.

In the case, for example, of the mixture conventionally called soluble oil and consisting of a stable emulsion of oil in a large amount of water, e.g. 0.5% oil-in-water, it is impossible to discharge spent soluble oil directly into a drain since this may seriously pollute the water into which the drain discharges. The oil must therefore be withdrawn so that the water effluent is purified; the withdrawn oil is then destroyed e.g. by incineration.

In conventional methods of processing or "breaking down" soluble oils, attempts have been made to separate the oil and water directly. This separation is extremely difficult and the installations required are bulky since they have limited efficiency.

SUMMARY OF THE INVENTION

According to the present invention, there is provided a method of separating a first liquid from a second liquid through which the first liquid is distributed, comprising concentrating the first liquid in the form of an emulsion in which the second liquid is the dispersed component, and separating the said emulsion from the remainder of the second liquid.

Applied to the separation of an oil-in-water emulsion, this method can achieve higher efficiency. Oil is not separated in the form of oil but is converted into a water-in-oil emulsion very concentrated in oil. Experience shows that this emulsion has a strong tendency to separate from water naturally. The residual water is practically oil-free and can be discharged directly into a drainage system. The concentrated oil emulsion can be destroyed by incineration.

A soluble oil, for example, in the normal form in which it is used, i.e. a stable emulsion of oil in water (called the "right" form of emulsion) consists of a small volume of oil dispersed in fine droplets in a large volume of water. The concentration of oil is the concentration of the mixture. If, in the same mixture, the oil is collected in the form of a water-in-oil emulsion (called the "left" form of emulsion and normally called "mayonnaise") the mixture in fact consists of two mixtures, the first being the mayonnaise containing a high concentration of oil and the second being a more or less emulsified mixture of oil in water wherein the oil concentration is low, much lower than in the starting mixture and lower in proportion to the completeness with which the mayonnaise has formed.

In the method according to the invention applied in soluble oil, oil is collected in mayonnaise form by inverting the form of the emulsion from the right to the left form.

Thus according to the invention, in another aspect, there is provided a method of processing an emulsion in order to separate the dispersed and dispersing components therein, comprising the step of converting the initial emulsion into a mixture of two concentrates which are richer in respectively the dispersed component and the dispersing component than the initial emulsion, the said concentrate richer in the dispersed component being in the form of an emulsion inverted with respect to the initial emulsion, having the said dispersing component dispersed in the said dispersed component.

In conventional methods of processing soluble oils an attempt is made, in outline, to cancel the effect of the emulsifiers maintaining the stability of the oil-in-water emulsion. In the method according to the invention, on the other hand, the aim is to produce an emulsifying effect, but one in the water-in-oil direction. This method appears to draw maximum advantage from a favourable effect, i.e. a certain natural tendency of the mayonnaise to increase, i.e. to capture the oil droplets dispersed in water.

In practice the steps that will be taken to invert the form of the emulsion vary and should be adapted to each case, since the soluble oils for processing may differ in their original composition (which is always complex, more particularly with regard to the additives which they contain), their concentration with respect to water, and the changes in their constituents during use (such changes are usually classified as "ageing").

Preferably, the method includes subjecting the initial emulsion to the combined effect of at least one additive and agitation, the combined effect promoting the formation of the inverted emulsion. Suitable additives which may be added in the method are salts, pH modifiers, emulsifiers or agents modifying the additives to the oils. Mechanical means suitable for agitating the medium are agitators, mixing or circulating pumps passing the liquid through a filter, ultra-sonics, etc.

The mayonnaise can be separated from the oil-free water by natural decantation, which can be accelerated by various methods e.g. flotation by water saturated with air, electro-flotation centrifuging, coalescence, etc. The process can be continuous and heating may not be required.

In the additive, divalent or trivalent metal ions are preferred, though monovalent ions may be highly effective.

The method of the invention can be applied to mixtures other than soluble oils, inter alia in order to recover a liquid forming the low-concentration component of a mixture. This component may be concentrated in the form of the main constituent of a mayonnaise emulsion. Either the liquids in the mixture for treatment are themselves suitable as consitutents of the mayonnaise emulsion, or a substance having a selective affinity for the constituents to be withdrawn and adapted to give a mayonnaise with the other constituent is added to the mixture.

The following non-limitative examples of the method aspects of the invention show how the invention may be put into practice.

EXAMPLE 1

A new sample of a soluble oil (sold under the name ESSO EZL 341) was diluted to 5% in water to give an emulsion whose constitutents were to be separated. The emulsion had a pH of 8.5. 3 grams per liter of calcium chloride were added and 30 liters of the resulting mixture were placed in a tank and agitated by means of a pump (600 liters per hour) which conveyed the liquid through a 30-micron filter the function of which was possibly to produce internal agitation in the fine ducts forming the filter. The oil and water constituents travelled through the filter and returned to the tank where they were taken up by the pump. After 15 minutes' agitation in a closed circuit, oil drops were observed to form and increase in size (this was perceptible to the eye through a transparent wall). The droplets, consisting of an emulsion of water in oil, rose in the bath to a place where agitation was less intense. After half an hour, agitation was stopped and the contents of the tank conveyed through a pasteboard filter (coalescer) having a pore size of 5 microns. The water collected at the base of the filter was completely clear and contained less than 15 ppm (part per million) of oil, whereas practically pure oil was discharged from the top of the separator.

EXAMPLE 2

A mixture of spent soluble oils (sold under the name MOTUL — COUPEX PN and $PNC_3$ — LABO SB 223) having an oil concentration of approximately 4%, was processed by the method described in Example 1. The pH was slightly reduced (to 9) by adding sodium carbonate before agitation began. During agitation the pH may be brought to 7.5. The resulting purified water contained 20 ppm of oil.

EXAMPLE 3

A soluble oil (sold under the name ESSO EZL 341), spent after being used for several months, was processed by the method described in Example 1. Before calcium chloride was introduced, it was necessary to add a water-in-oil emulsifying agent (a product sold under the name CEPRETOL MO by Societe Rhone Progil), since the oils had aged considerably, probably because of modifications in the additives, inter alia emulsifying agents, which they contained. The pH was brought to 9, as in Example 2, and reduced to 7.5 during agitation. As before the separation yield was good, since the oil-free water contained less than 24 ppm of oil. The use of calcium chloride, or more generally of the salt of an alkaline earth metal, has the advantage of preventing hydroxide sludge forming when the pH is brought to near neutrality.

Where an oil-in-water emulsion (the right form), conventionally called a soluble oil, is processed, it may be advantageous to add two reagents. A first reagent modifies the physico-chemical conditions in the direction favourable the left form, whereas a second reagent effectively inverts the form, i.e. produces the left form of emulsion of mayonnaise. Such a process is illustrated by the accompanying drawing referred to below. In its apparatus aspect, the invention is especially though not exclusively applicable to a process of this kind which is performed continuously.

According to the invention in the apparatus aspect, there is provided apparatus for the continuous processing of material in emulsion form by the method described above, including
a. means providing a main flowpath for the material
b. supply means to provide a flow of the material in the said flowpath
c. means adapted to inject at controlled rate at least one reagent into the said flow of material
d. means adapted to intimately mix said injected reagent with the flow of material.

Preferably means for subjecting the material to agitation are provided. The functions of mixing the added reagent and of agitation may be combined.

The main flowpath may include a volume in which agitation is performed, a reagent being preferably injected immediately upstream of or even inside the fractional volume.

In an advantageous arrangement, the mixing and the action of the reagent are brought about or prolonged by recycling inside the volume, preferably in countercurrent to the main flow. This recycling is particularly advantageous if the emulsion entering the fractional volume meets the emulsion which has already been inverted; the resulting conditions are favourable for inversion.

The last-mentioned feature is efficient and used little energy, since the amount mixed can be kept small, corresponding to the fractional volume.

The fractional volume can be a small chamber disposed in the main flowpath. Agitation in the chamber can be produced by various means such as an agitator, a vibrator, ultra-sonics, etc.

Where recycling is performed, the fractional chamber may be all of the main flowpath where recycling occurs; the reagent is preferably injecting upstream of the circulation pump, either in the main circuit or in a loop or shunt circuit used for recycling.

The apparatus may be simplified by omitting the chamber, i.e. by connecting the shunt circuit directly to the main circuit. An arrangement of this kind is shown by way of example in the accompanying drawing, in which the single figure is a diagram of a non-limitative embodiment of the apparatus according to the invention.

DESCRIPTION OF A PREFERRED EMBODIMENT

The apparatus has a main flowpath 1 provided with a supply pump 2 conveying the emulsion from an inlet 1a to an outlet 1b and having a delivery rate $d$. Shunt circuits 3, 4 forming loops off the main circuit are provided with circulating pumps 5, 6. The first reagent is injected at a controlled rate by a proportioning pump (not shown) at 7 into the shunt circuit 3 upstream of pump 5. The second reagent is injected at 8 into shunt circuit 4 upstream of pump 6. Each circulation pump 5, 6 has a delivery rate greater than $d$.

The apparatus operates continuously as follows: Emulsion is introduced into the main circuit by pump 2 and enters shunt circuit 3 where the first reagent (e.g. the salt of an alkaline earth metal and/or an emulsifier) is injected at 7, and travels through the loop comprising shunt circuit 3 and the portion of the main circuit between the two ends of the shunt. The amount of recycling of the emulsion, i.e. the statistical number of times that a particle of emulsion travels through the loop, is higher in proportion as the delivery rate of pump 5 is greater than that of pump 2. The duration of recycling depends on the length of the shunt.

After leaving shunt 3, the emulsion flows along the main circuit at the rate $d$. The second reagent (e.g. the salt of a trivalent metal or a pH modifier) is introduced in shunt 4 and produces the inversion. The device continuously discharges a mixture of water and of mayonnaise particles containing a variable amount of water.

The water and mayonnaise can subsequently be separated by natural decantation or by any other, more rapid method, such as flotation by water saturated with air.

The arrangement illustrated has the advantage of great simplicity and the apparatus can be compact, light and cheap. Experience shows that the device can process a greater variety of soluble oils (natural or concentrated) so that the process is widely applicable, and that some tolerance is permissible in the proportioning of the reagents, so that the process is highly reliable.

While the invention has been illustrated above by reference to several examples and a preferred but nonlimitative embodiment thereof, it will be understood by those skilled in the art that various changes may be without departing from the spirit and scope of the invention and it is intended to cover all such changes and modifications by the appended claims.

What is claimed is:
1. A continuous method of processing a stable emulsion of oil-in-water comprising the steps of:
   a. providing a main flowpath of an initial oil-in-water emulsion at a slightly alkaline pH,
   b. diverting a portion of the emulsion from the main flowpath into a first shunt circuit,
   c. injecting the first additive selected from the group consisting of salts of an alkaline earth metal at a controlled rate into said first shunt circuit,
   d. joining the first shunt circuit to said main flowpath of initial emulsion thereby forming a mixture of said first additive and initial emulsion.
   e. diverting a portion of the mixture formed in (d) from the main flowpath into a second shunt circuit,
   f. injecting a second additive selected from the group consisting of salts of divalent and trivalent metals at a controlled rate into said second shunt circuit to cause inversion of said initial emulsion,
   g. joining said second shunt circuit to the main flowpath, and
   h. allowing the resultant mixture from step (g) to separate into separate layers of water and a water-in-oil emulsion.
2. The process of claim 1 wherein the rate of flow in said first and second shunt circuits is greater than the rate of flow in said main flowpath.

* * * * *